(12) United States Patent
Schütz

(10) Patent No.: US 6,666,311 B1
(45) Date of Patent: Dec. 23, 2003

(54) SPRING STRUT SUPPORT BEARING

(75) Inventor: Michael Schütz, Schliengen (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/627,992

(22) Filed: Jul. 28, 2000

(30) Foreign Application Priority Data

Jul. 30, 1999 (DE) .......................................... 199 35 391

(51) Int. Cl.$^7$ .................................................. F16F 9/00
(52) U.S. Cl. .................... 188/321.11; 267/220; 267/33; 267/293
(58) Field of Search ........................ 267/140.11, 140.12, 267/140.13, 152, 153, 292–294, 195, 219, 258, 220, 33; 280/668, 710, 712; 188/321.11

(56) References Cited

U.S. PATENT DOCUMENTS

| | | |
|---|---|---|
| 4,465,296 A | 8/1984 | Shiratori et al. |
| 4,981,287 A | 1/1991 | Cothenet |
| 5,009,401 A * | 4/1991 | Weitzenhof .............. 267/64.21 |
| 5,487,535 A * | 1/1996 | Carter ....................... 267/220 |

FOREIGN PATENT DOCUMENTS

| | | |
|---|---|---|
| DE | 43 31 585 | 3/1994 |
| DE | 198 03 174 | 9/1998 |
| DE | 197 55 313 | 6/1999 |
| JP | 07-152078 | 6/1995 |

\* cited by examiner

Primary Examiner—Christopher P. Schwartz
Assistant Examiner—Melanie Torres
(74) Attorney, Agent, or Firm—Kenyon & Kenyon

(57) ABSTRACT

A spring strut support bearing, has a top bearing that can be affixed by its inner ring to the front end of an automobile, e.g. to the end of a piston rod of a shock absorber facing a vehicle body. The inner ring is surrounded by an outer ring with radial clearance; at least one elastic spring element made of rubber-elastic material is arranged in a gap formed by the clearance. The outer ring is disposed in a stationary manner with respect to the vehicle body; and only the component of the loading force of the shock absorber extending through the elastic spring element of the top bearing reaches the vehicle body. The inner ring has on each of its two end faces at least one elastically flexible stop buffer for limiting extreme deflection movements in moving direction of the shock absorber, the stop buffers each having the capability of being brought into contact with counter stop faces.

8 Claims, 3 Drawing Sheets

SPRING STRUT SUPPORT BEARING

FIELD OF THE INVENTION

The invention relates to a spring strut support bearing.

BACKGROUND OF THE INVENTION

Spring strut support bearings (also known as suspension turret webs) are generally known and, for example, form a part of a front suspension in a motor vehicle.

SUMMARY OF THE INVENTION

The object of the present invention is to further develop a suspension turret web in such a way that extreme deflections of the inner ring in the direction of the introduced vibrations are limited in relation to the outer ring of a top bearing which forms a component of the spring strut. A further object is that undesirably high shearing stresses in the elastic spring element which connects the inner and outer rings of the top bearing be prevented, and that because of this, the suspension turret web exhibits uniformly good working properties during a longer service life.

To achieve the objective, a suspension turret web is provided which includes a top bearing that is able to be affixed by its inner ring to the front end, the end of a piston rod of a shock absorber facing a vehicle body. The inner ring is surrounded by an outer ring with radial clearance. At least one elastic spring element made of rubber-elastic material is arranged in the gap formed by the clearance, and the outer ring is disposed in a stationary manner with respect to the vehicle body. The inner ring has on each of its two end faces at least one elastically flexible stop buffer for limiting extreme deflection movements in the moving direction of the shock absorber, and the stop buffers each have the capability of being brought into contact with counter stop faces. The above-described embodiment ensures the prevention of undesirably high shearing stresses within the elastic spring element which reduce its service life, because the deflection movement of the inner ring relative to the outer ring is limited by the elastically flexible stop buffers. In this context, the counter stop faces are fixedly joined to the vehicle body. Parts which are fixedly joined to the vehicle body, thus, for example, plates which are bolted or welded to the vehicle body, also belong to the vehicle body within the framework of the present invention. The stop buffers always contact their counter stop faces when low-frequency, large-amplitude vibrations are introduced into the shock absorber, for example, when the wheel runs over the curb.

The top bearing can be produced simply and cost-effectively by forming the stop buffers and the elastic spring element in one piece and of the same material. The stop buffers and the elastic spring element are injected in one shared operation into a tool cavity in which the inner ring and the outer ring of the top bearing are already inserted. Following the injection of the rubber-elastic material, this material hardens gradually and clutches permanently with claw-like fixation to the surfaces of the inner and outer rings.

Another embodiment offers the possibility of producing the stop buffers separately and connecting them frictionally and/or with form locking to the respective end face of the inner ring. An advantage in this case is that the stop buffers can be adapted particularly well to the respective conditions of the specific application, irrespective of the material from which the elastic spring element is made. For example, the stop buffers can be mounted with adhesive on the end faces of the inner ring or can have the ability to snap into undercut, e.g., dovetailed recesses, of the inner ring.

A comparatively more durable, form-locking connection can be achieved in that the inner ring has at least one opening extending essentially in the axial direction from end face to end face, and the opening is penetrated by material of the stop buffers. Such an embodiment is only useful when the rubber-elastic material is injected into a tool cavity and subsequently vulcanized between the inner ring and outer ring.

Stop buffers made of a cellular polyurethane have particularly advantageous working properties. Compared to other materials, cellular polyurethane has the advantage that the damping capacity increases relatively with the increase in amplitude, and the dynamic hardening is generally not so high compared to elastomers.

The stop buffers can be formed on each side of the inner ring by, in each case, at least three lug cams uniformly distributed in the circumferential direction. The form of the lug cams is preferably such that a progressively rising spring tension results as the spring deflection path increases. This ensures that the stop buffers contact the counter stop faces gently at first, e.g., to prevent shaking and sharp noises, and a stronger bracing of the two parts against each other only results as the spring deflection path increases.

The outer ring can be stationary mounted in an essentially cup-shaped flange, the flange and the vehicle body being fixedly joined. Such an embodiment is advantageous with a view to producing suspension turret webs in the unitized construction system. Variously configured flanges offer the possibility of adapting the suspension turret web to the respective installation situation.

DETAILED DESCRIPTION OF THE INVENTION

Figure 1:
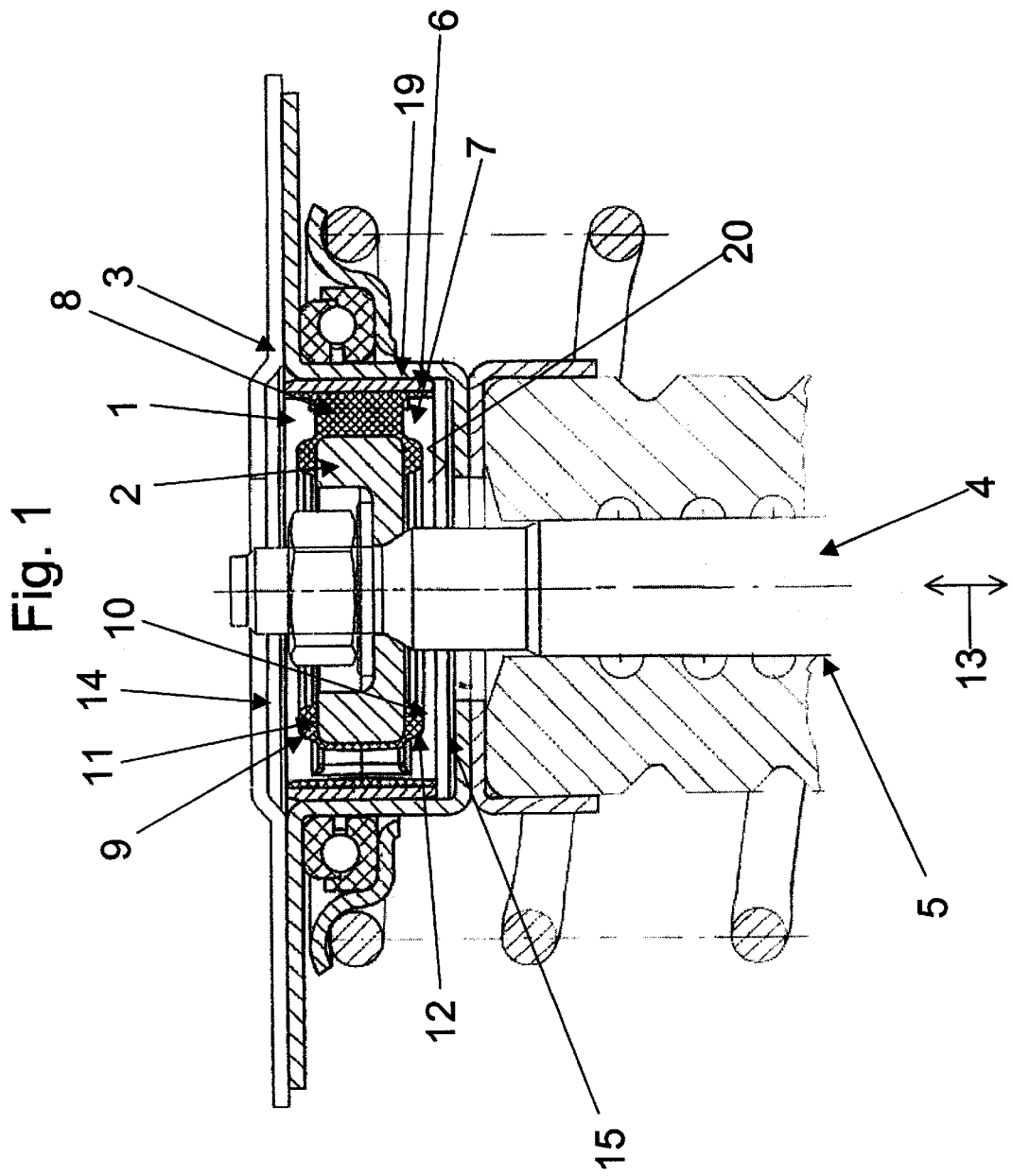
FIG. 1 is a cross-sectional view of a first embodiment of the invention.

FIG. 1 shows an exemplary embodiment of a spring strut support bearing, which has a top bearing 1 composed of an inner ring 2 and an outer ring 6 surrounding inner ring 2 with radial clearance. The inner ring 2 and outer ring 6 are joined by elastic spring element 8 arranged within gap 7. The top bearing 1 may be affixed by inner ring 2 to the front end of an automobile, e.g., to the end of a piston rod 4 of a shock absorber 5 facing a vehicle body.

In this exemplary embodiment, stop buffers 11, 12, which are arranged on end faces 9, 10 of inner ring 2, are configured integrally and continuously with elastic spring element 8. An embodiment deviating from this, which can be used here as well, is shown in FIGS. 2 and 3, respectively.

Outer ring 6 is pressed into a cup-shaped flange 19 that is immovably joined to vehicle body 3, e.g., by a screw coupling or welding.

Figure 2:
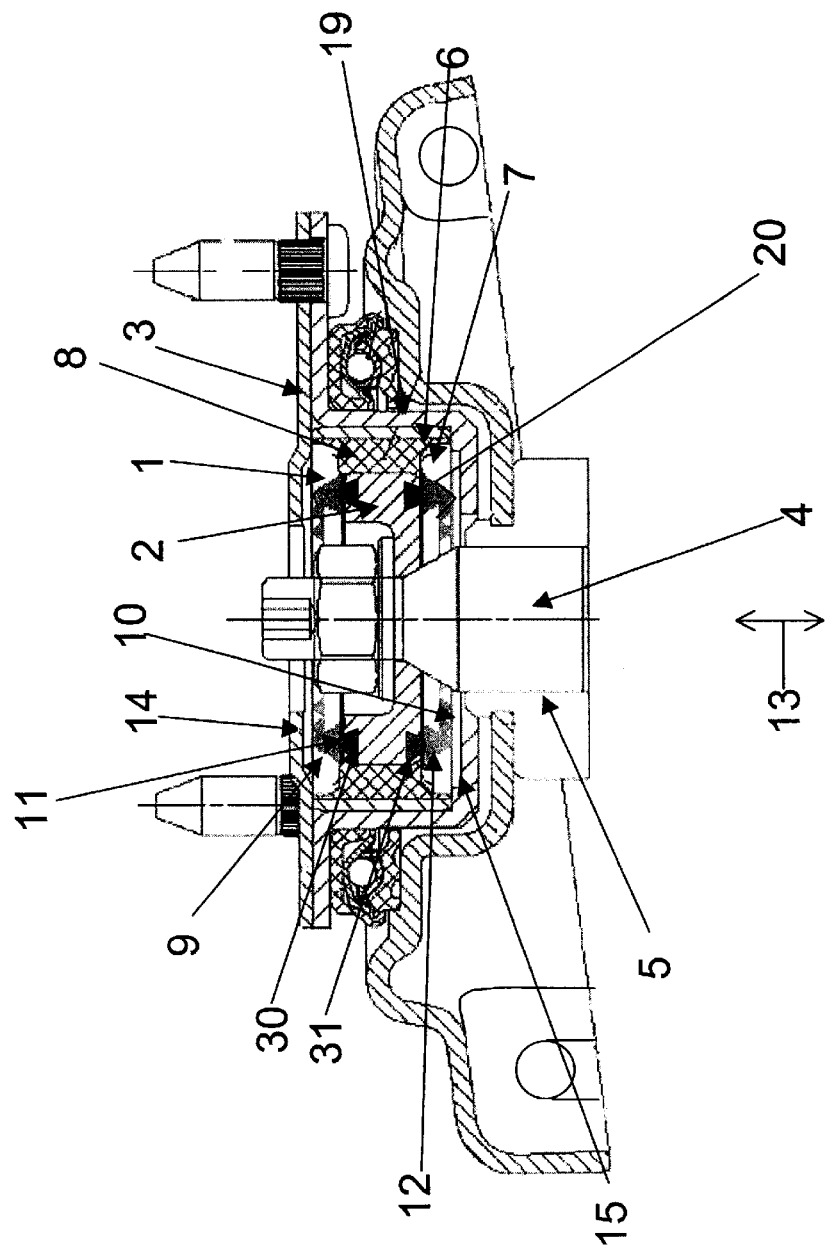
FIGS. 2 and 3 are cross-sectional views of embodiments having differing stop buffers.
Figure 3:
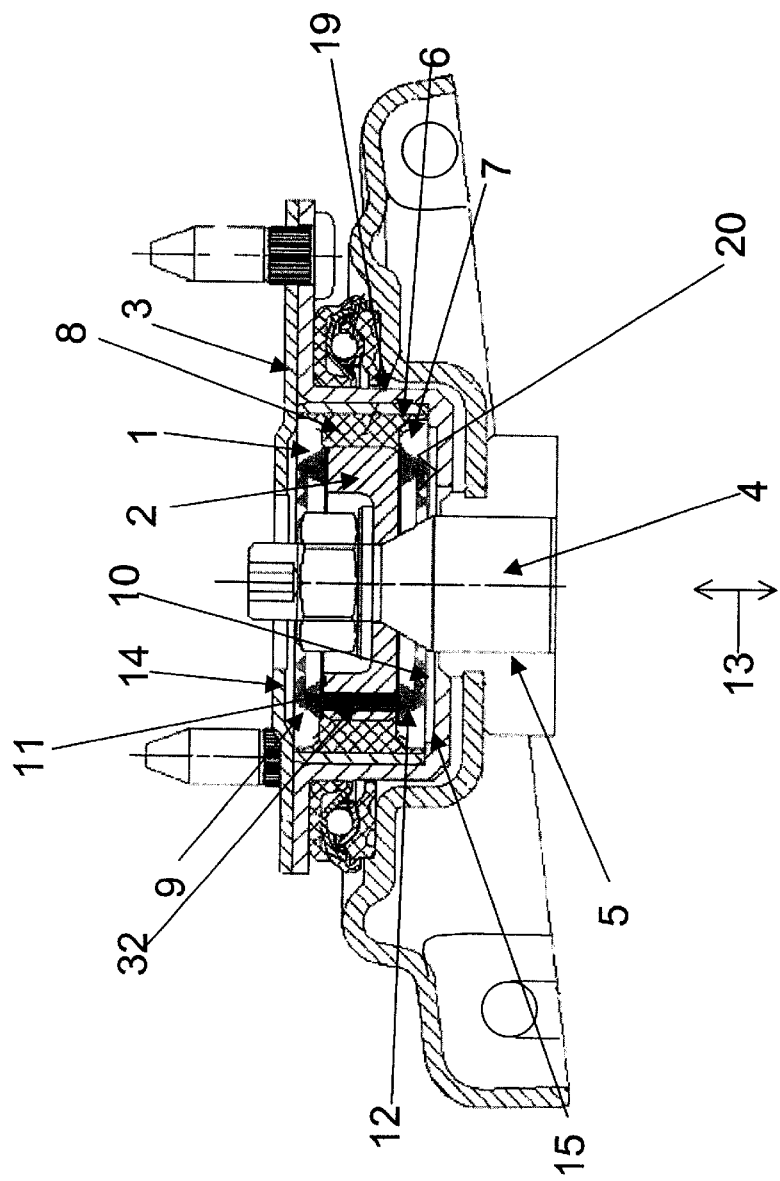

FIGS. 2 and 3 each show a cutaway portion from top bearing 1 of FIG. 1, stop buffers 11, 12 being affixed to inner ring 2 differently than in the embodiment of FIG. 1.

In FIG. 2, stop buffers 11, 12 are produced separately and joined to respective end faces 9, 10 of inner ring 2 with form locking. Additionally or alternatively, it is possible to provide a frictional connection, e.g., by cementing.

In this embodiment, stop buffers 11, 12 are snapped into undercut recesses 30, 31 of respective end faces 9, 10 of inner ring 2, recesses 30, 31 each being dovetailed.

In FIG. 3, inner ring 2 has a plurality of openings 32 that extend essentially in the axial direction from end face 9 to end face 10 and are distributed in the circumferential direction, openings 32 being penetrated by the elastomeric material of stop buffers 11, 12. Particularly good durability is achieved in this manner.

Separately formed stop buffers 11, 12 are preferably made of a cellular polyurethane.

In response to extreme deflection movements of inner ring 2 in moving direction 13 relative to outer ring 6, stop buffers 11, 12 come in contact with counter stop faces 14, 15, counter stop face 15 being formed by bottom 20 of flange 19. Upper end-face stop buffer 11 contacts counter stop face 14 which is designed as a cover and forms a component of vehicle body 3.

What is claimed is:

1. A spring strut support bearing, comprising:
   a top bearing having an inner ring by way of which the top bearing can be affixed to the end of a piston rod of a shock absorber connected to a vehicle body;
   an outer ring surrounding the inner ring with radial clearance defining a gap therebetween, the outer ring being stationary with respect to the vehicle body; and
   at least one elastic spring element made of elastic material located in the gap formed by the clearance;
   wherein the inner ring has two end faces, on each of which has at least one elastically flexible stop buffer for limiting extreme deflection movements along a deflection direction defined by the motion of the shock absorber, each of the stop buffers having the capability of being brought into contact with counter stop faces;
   wherein the stop buffers are produced separately and connected frictionally and/or with form locking to the respective end face of the inner ring; and
   wherein the stop buffers are snapped into undercut recesses in the respective end faces of the inner ring.

2. The spring strut support bearing as recited in claim 1, wherein the outer ring is fixedly mounted in an essentially cup-shaped flange, and the flange is fixedly joined to the vehicle body.

3. The spring strut support bearing as recited in claim 2, wherein the counter stop faces are formed axially on the one side by bottom of the flange, and axially on the other side by the vehicle body.

4. A spring strut support bearing, comprising:
   a top bearing having an inner ring by way of which the top bearing can be affixed to the end of a piston rod of a shock absorber connected to a vehicle body;
   an outer ring surrounding the inner ring with radial clearance defining a gap therebetween, the outer ring being stationary with respect to the vehicle body; and
   at least one elastic spring element made of elastic material located in the gap formed by the clearance;
   wherein the inner ring has two end faces, on each of which has at least one elastically flexible stop buffer for limiting extreme deflection movements along a deflection direction defined by the motion of the shock absorber, each of the stop buffers having the capability of being brought into contact with counter stop faces;
   wherein the inner ring has at least one opening extending essentially in the axial direction from end face to end face, and that the opening is penetrated by material of the stop buffers.

5. The spring strut support bearing as recited in claim 4, wherein the stop buffers are made of cellular polyurethane.

6. A spring strut support bearing, comprising:
   a top bearing having an inner ring by way of which the top bearing can be affixed to the end of a piston rod of a shock absorber connected to a vehicle body;
   an outer ring surrounding the inner ring with radial clearance defining a gap therebetween, the outer ring being stationary with respect to the vehicle body; and
   at least one elastic spring element made of elastic material located in the gap formed by the clearance;
   wherein the inner ring has two end faces, on each of which has at least one elastically flexible stop buffer for limiting extreme deflection movements along a deflection direction defined by the motion of the shock absorber, each of the stop buffers having the capability of being brought into contact with counter stop faces;
   wherein the stop buffers are produced separately and connected frictionally and/or with form locking to the respective end face of the inner ring; and
   wherein the inner ring has at least one opening extending essentially in the axial direction from end face to end face, and that the opening is penetrated by material of the stop buffers.

7. A spring strut support bearing, comprising:
   a top bearing having an inner ring by way of which the top bearing can be affixed to the end of a piston rod of a shock absorber connected to a vehicle body;
   an outer ring surrounding the inner ring with radial clearance defining a gap therebetween, the outer ring being stationary with respect to the vehicle body; and
   at least one elastic spring element made of elastic material located in the gap formed by the clearance;
   wherein the inner ring has two end faces, on each of which has at least one elastically flexible stop buffer for limiting extreme deflection movements along a deflection direction defined by the motion of the shock absorber, each of the stop buffers having the capability of being brought into contact with counter stop faces;
   wherein the stop buffers on each end face of the inner ring are formed in each case by at least three lug cams uniformly distributed in the circumferential direction.

8. A spring strut support bearing, comprising:
   a top bearing having an inner ring by way of which the top bearing can be affixed to the end of a piston rod of a shock absorber connected to a vehicle body;
   an outer ring surrounding the inner ring with radial clearance defining a gap therebetween, the outer ring being stationary with respect to the vehicle body; and
   at least one elastic spring element made of elastic material located in the gap formed by the clearance;
   wherein the inner ring has two end faces, on each of which has at least one elastically flexible stop buffer for limiting extreme deflection movements along a deflection direction defined by the motion of the shock absorber, each of the stop buffers having the capability of being brought into contact with counter stop faces;
   wherein the stop buffers and the elastic spring element are formed in one piece and of the same material; and
   wherein the stop buffers on each end face of the inner ring are formed in each case by at least three lug cams uniformly distributed in the circumferential direction.

* * * * *